E. S. SHAW.
Joints for Iron Truss-Bridges.
No. 159,046. Patented Jan. 26, 1875.
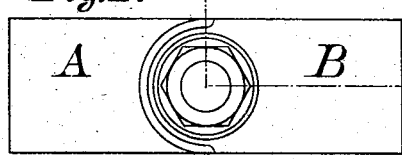
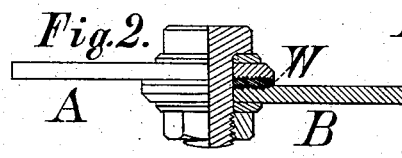
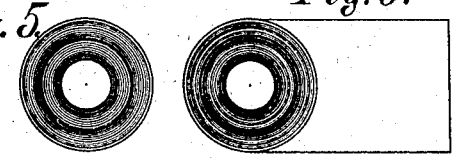
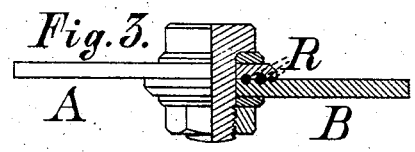
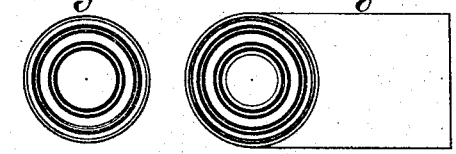
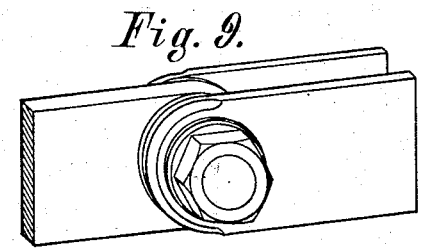
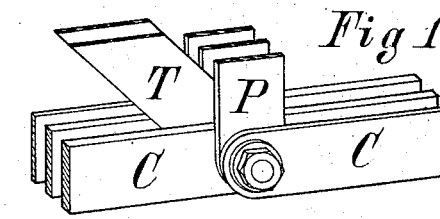
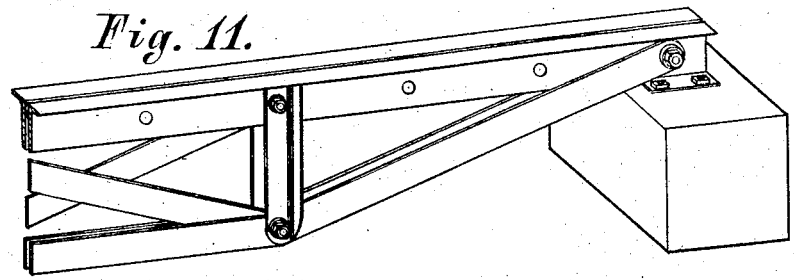
Witnesses.  Inventor.
Edward S. Shaw

UNITED STATES PATENT OFFICE.

EDWARD S. SHAW, OF CAMBRIDGE, MASSACHUSETTS.

IMPROVEMENT IN JOINTS FOR IRON TRUSS-BRIDGES.

Specification forming part of Letters Patent No. 159,046, dated January 26, 1875; application filed January 6, 1875.

*To all whom it may concern:*

Be it known that I, EDWARD S. SHAW, of Cambridge, in the county of Middlesex and State of Massachusetts, have invented an Annulate Joint for Iron Bridges and other engineering construction, of which the following is a specification:

My invention consists in a mode of joining plates, bars, or otherwise shaped pieces of iron, steel, or other suitable metal, so that the combination of bars or other shapes may withstand a stress of tension or compression of an intensity as great as could safely be imposed upon a single bar or piece of the same material, and a joint is produced which may be made flexible or rigid at will.

In order to describe and illustrate the construction of this joint, I will take a simple case of joining, and will suppose that two flat bars of iron, each measuring about four inches by one-half inch in section, are to be connected for the purpose of forming a continuous tension member. I then proceed as follows: I bore through each plate, near its end, and in the middle of its broad face, a cylindrical aperture, circular in section. I next cut or stamp into one of the broad faces of each bar circular grooves or depressions, concentric with one another, and with the aperture which they encircle. These grooves may be of semicircular section; or they may have a section similar to a screw-thread of the Whitworth or Sellers pattern; or, indeed, they may be shaped in other forms; but at present I prefer those above mentioned. In case that I have cut channels of a semicircular section in the plate-faces, I bend wires into rings of size and section to fit the channels, and insert these rings in the channels. I then bring the bars together, and confine them by a bolt contained in the eyes cut in the plates, the heads or nuts of the bolt acting on the outer plate-faces to draw the plates together. But if I have cut in the plates channels of the screw-thread section close together, thus surrounding the eye by a number of annulets, I then prepare an annulated washer by taking a piece of tolerably thin plate of circular shape, forming an eye in its center, and cutting or stamping into the surface surrounding the eye, on each side of the plate, annulets of the screw-thread section, the pitch of which is so adjusted that they may fit and engage with the annulets of the plates to be fastened together. I then interpose the washers, and bring the plates together, as before, by a bolt passing through the eyes.

Figure 1 shows an outside view of this joint; Fig. 2, an outside-edge view and section through center of plates; and Fig. 3, a view and section of the joint formed with rings. Figs. 6 and 8 show the annulations of the plate for the two modifications of this joint. Fig. 5 shows a transverse section and face view of the annulated washer; Fig. 4, an enlarged section of a part of the washer; and Fig. 7, the rings for the joint shown by Figs. 3 and 8.

It is seen, by reference to Fig. 4, that the outer annulets of the washer are truncated, and that the plates are cut to a correspondingly less depth in their outer annulations. This is in order to prevent a weakening of the plate by a deep outer cut. The same result is attained in the case of the joint formed with separate rings, by making the outer ring of smaller section than the inner ones.

I have described above the simplest form of my invention—that of a joint between two plates. It is evident that several plates may be joined by lapping their extremities, cutting annulets on both broad faces of all plates except the outer ones, and interposing a sufficient number of rings or annulated washers. It is also evident that flat plates may be joined to flat surfaces of the ordinary rolled-iron shapes, known as "I," "T," "L," channel irons, &c., or to pieces or members of cast-iron, whose ends may be molded into annulated faces for this purpose.

Fig. 9 shows the connection by the annulate joint of a single plate with two other plates of half its thickness.

Fig. 10 shows a bridge-joint. C marks the tension-chord plates. T marks plates either forming in themselves the diagonal ties, or to which the diagonal ties may be attached. P marks plates to which the post or vertical strut may be attached.

Fig. 11 shows the attachment of plates to other plates and to angle-irons by the annulate joint, the combination forming a small trussed girder, and is self-explaining.

The problem of the mechanical formation of the annulets of the plates and washer is one of no great difficulty. They may be cut by the use of a chasing-tool set eccentrically in the chuck of a lathe, stamped with dies, formed in castings by impression of the mold, or formed by a combined process of stamping and cutting or molding and cutting.

The effect of the above-described joint is to transfer the stress from one bar to another by an action precisely analogous to that of a bolt upon its nut by means of the screw-thread.

If the annulated surface outside of the eye be made sufficiently large, the bolt may be made to have considerable play in the eye, and its action will then be to resist a stress of simple tension, caused by the tendency of the bars to spread laterally, which tendency, with certain forms of annulets, is very small; but if it is not possible or convenient to make the annulated surface large enough to transmit the whole stress upon the bar, then the bolt may be made to fit tightly in the eye, and thus assist, by its resistance to shearing, in giving to the joint the required strength.

The invention above described is the result of an investigation, instigated by a desire to produce a connection for the lower chords of bridges more simple, light, and economical than those now in use.

I do not wish, however, to confine its application to bridges alone, but propose to use the joint in any engineering structure where it may be scientifically or conveniently applicable as a connection.

What I claim as my invention, and desire to secure by Letters Patent, is—

A joint formed by cutting, stamping, or molding into the surfaces of the parts to be connected concentric annular depressions or grooves, interposing rings or an annulated washer fitted to said depressions or grooves, and confining the surfaces in juxtaposition by a bolt contained in eyes concentric with said depressions or grooves, and provided with suitable nuts or heads and washers, substantially as and for the purposes described.

In testimony whereof I have signed my name to this specification in the presence of two subscribing witnesses.

EDWARD S. SHAW.

Witnesses:
JOS. H. ADAMS,
M. S. G. WILDE.